May 28, 1929. H. H. WEBB 1,714,650
ROUTE MAP HOLDER
Filed Nov. 12, 1927
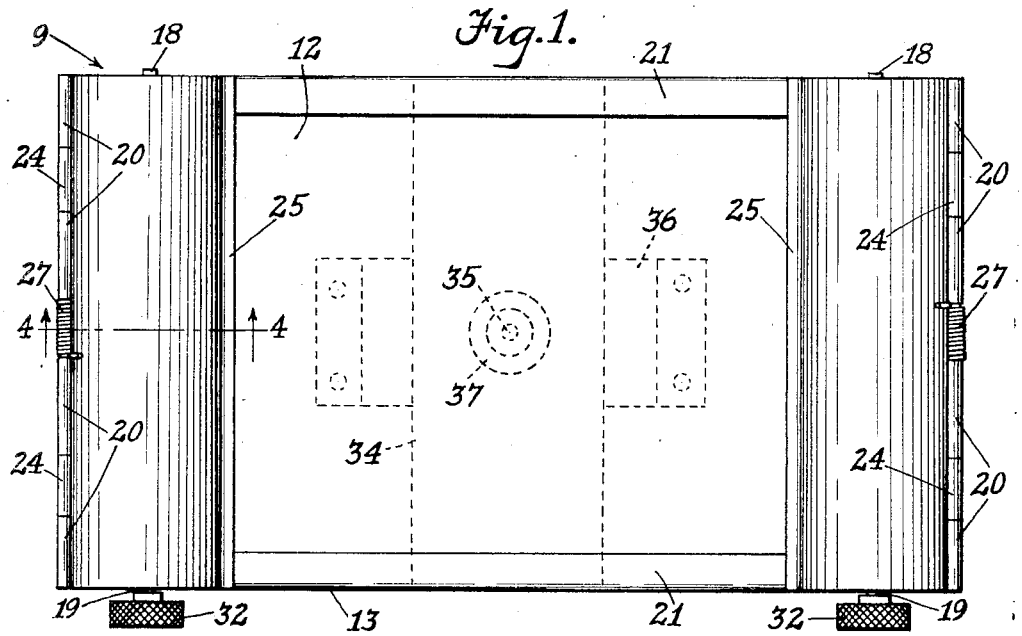
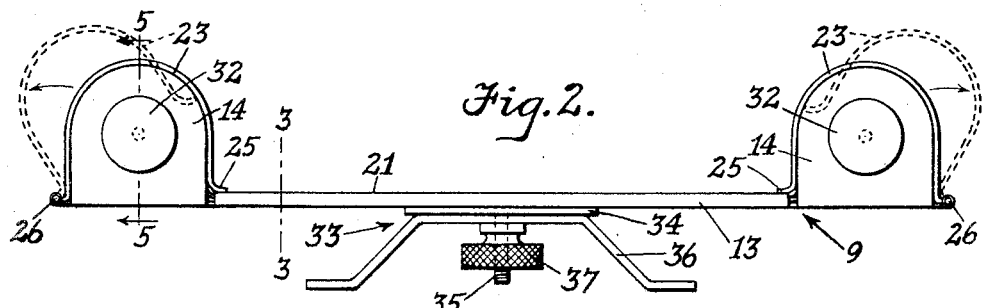
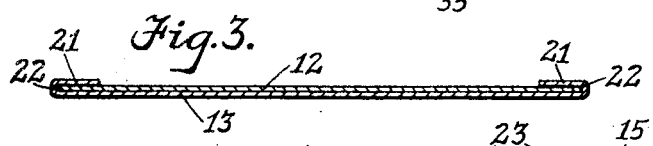
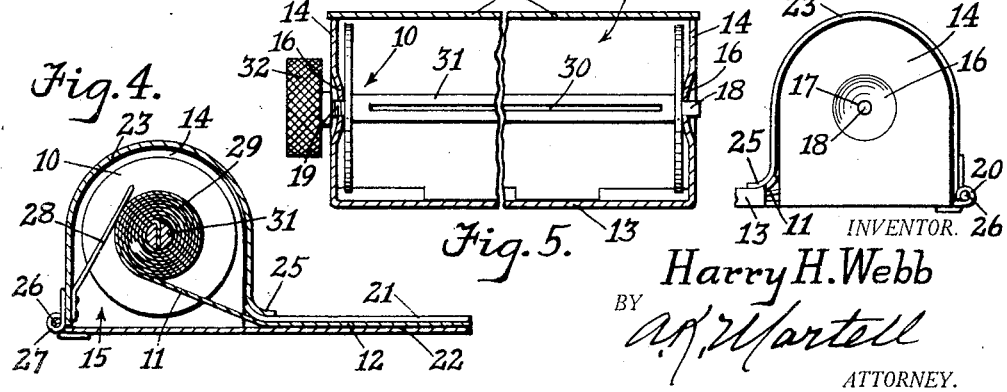
INVENTOR.
Harry H. Webb
BY A. K. Martell
ATTORNEY.

Patented May 28, 1929.

1,714,650

UNITED STATES PATENT OFFICE.

HARRY H. WEBB, OF LOS ANGELES, CALIFORNIA.

ROUTE-MAP HOLDER.

Application filed November 12, 1927. Serial No. 232,774.

My invention relates to a map holding device for a special form of road map or route map, designed for automobile or airplane tourists, and drivers.

The large amount of travel by automobile in these times and the rapidly increasing use of airplane for flights over long distances make desirable a convenient map of the road or route to be traveled, for the guidance of drivers and air pilots.

The primary object of my invention is to provide a map holder, which will hold a complete and continuous map of the road or route to be traveled and which may be manipulated to keep in view only that part of the map which is needed for guidance at any particular time.

A further object is to provide a map holder of the character described which readily may be mounted in an automobile, airplane or like vehicle in such a position as to be constantly under the eye of the driver or pilot.

Other objects and advantages will appear hereinafter and while I show herewith and will describe a preferred form of construction, I desire it to be understood that I do not limit myself to such preferred form but that various changes and adaptations may be made therein without departing from the spirit of my invention as hereinafter claimed.

Referring to the drawings which accompany this specification and form a part thereof.

Fig. 1 is a plan view of a map holder embodying the principles and features of my invention.

Fig. 2 is a side view of the map holder device shown in Fig. 1.

Fig. 3 is an enlarged sectional view of same, taken on line 3—3 of Fig. 2.

Fig. 4 is an enlarged sectional view of the device, taken on line 4—4 of Fig. 1.

Fig. 5 is an enlarged fragmentary sectional view of the map holder taken on line 5—5 of Fig. 2, showing one of the chambers and one of the spools, the middle parts being shown broken away to save space.

Fig. 6 is a fragmentary view of the device showing the side thereof opposite to that shown in Fig. 2.

Considering the drawings more in detail my map holder will be seen to comprise a rectangular casing 9, preferably made of sheet metal, two spools 10, one in each end of the casing, and a relatively long sheet 11 of paper, cloth or other suitable material, upon which the map is drawn or printed. The ends of said sheet 11 are wound on said two spools so that a straight section 12 thereof is stretched between them.

The base 13 of casing 9 is made of a single piece of sheet metal, cut to a suitable length and width with opposite lateral extensions near each end which are bent at right angles to the base to form end-walls 14 for each of the two chambers 15 in which the spools 10 are mounted. End-walls 14 are dished inwardly in the center, as at 16, and perforations 17 are made therein to receive pivot pins 18 and 19 formed on the ends of spools 10. The ends of the base sheet are cut and bent to form hinge loops 20 and the sides are turned upwardly and toward each other, as at 21, to form opposite grooves 22 in which the edges of the stretched section 12 of map sheet 11 are held so that they run freely therein.

Semi-cylindrical chamber covers 23, bent to conform rather closely to end-walls 14 and provided on one side with hinge loops 24, adapted to dove-tail with loops 20 and on the other side with outwardly turned flanges 25, are held in hinged relation to base 13 by hinge pins 26 which extend through loops 20 and 24. A helical spring 27, adapted to yieldably hold cover 23 in its closed position, is mounted on each hinge pin 26 at approximately its middle part. A weak leaf-spring 28, adapted to press lightly against the map rolls 29 on spools 10 so as to prevent undue loosening of the former on the latter, is attached to the inner side of each cover 23 at approximately the middle of its length.

A diametrical slot 30, adapted to receive one end of the map sheet, is cut through each spool shaft 31 almost from end to end thereof. Pivot pins 19 on one end of each spool are made long enough to project somewhat beyond end walls 14 and their projecting ends are threaded so that knurled nuts 32 may be screwed thereon, said knurled nuts serving as a means whereby the spools may be turned to wind the map sheet off of one spool onto the other and thus to shift the map from left to right or in the reverse direction.

In order that the map holder may be turned into different positions and may be set to correspond with the road or route which is being traveled, a swivel bracket 33 is provided for mounting it. This swivel bracket consists of a transverse plate 34 fixed to the under side and in the middle of base 13, said plate 34 having a threaded pivot pin 35 fixed in its center, a bent plate 36 adapted to be fastened to a steering wheel, instrument board or other suitable device, said bent plate being turnable on pivot pin 35, and a clamping nut 37 screwed on pivot pin 35 so as to clamp the map holder on bent plate 36 and thus to hold it in any desired angular position.

It will be observed that the spool shafts 31, map rolls 29 and hinged covers 23 are all located above the face of the base plate 13, the cover hinges 26 being in the same plane with said base plate. This construction and arrangement therefore provides for supporting map rolls of relatively large diameter upon the device without interfering with turning the base plate to the desired position around its pivot pin 35, and also provides for convenient opening and closing of the map roll covers 23.

The operation of my map holder is evident from the foregoing description. As a matter of course, a special map must be prepared, in necessary detail, for each route to be traveled, suitable lines and characters being drawn or printed on the upper side of map sheet 11, from end to end thereof, to provide a continuous map of the route. The ends of the sheet are then wound on the two spools and the spools are placed in their respective chambers by opening up covers 23 and springing apart end-walls 14 to allow pivot-pins 18 and 19 to be inserted into perforations 17, the edges of the extended section 12 of the map sheet being simultaneously guided into grooves 22. Covers 23 are then allowed to close, under the influence of springs 27, and knurled nuts 32 are screwed onto pivot pins 19. The map holder having been mounted to suit the convenience of the driver or pilot he may shift the map in accordance with the progress of his journey by turning nuts 32.

While my map holder may be used to the greatest advantage, perhaps in connection with automobiles and airplanes, it is evident that it may be used also in connection with railway trains, in place of the usual time tables, and in connection with delivery wagons, to indicate the delivery route in place of the usual route lists.

Having thus illustrated and described my invention, I claim:

1. A map holder comprising a relatively small metal casing; two spool chambers forming the end parts of said casing, said spool chambers being fixed in parallel spaced relation to each other on an open-faced base which is provided with opposite grooves at its sides; spring-controlled covers on said spool chambers, said covers being hinged to the ends of said base; a relatively long map sheet having its ends wound on said spools and an intervening section thereof stretched along said base with its edges in said grooves; means whereby said casing may be mounted so that it may be turned and fixed in any angular position, and knurled knobs removably attached to said spools whereby they may be turned to shift said map sheet longitudinally in said casing.

2. A map holder comprising a relatively low support adapted to rest upon a horizontal surface, an elongated map-holding base turnably mounted upon said support to swing in a horizontal plane, a horizontal shaft mounted upon each end portion of said base above the plane thereof, map rolls supported by said shafts, and semi-cylindrical covers for said rolls, each of said covers being hinged to an outer end portion of said base and being manually swingable upon its hinge to afford access to the map roll covered thereby.

HARRY H. WEBB.